E. S. ALLEN.
LIGHTING DEVICE FOR GAS BURNERS.
APPLICATION FILED APR. 30, 1914.
1,124,383.
Patented Jan. 12, 1915.
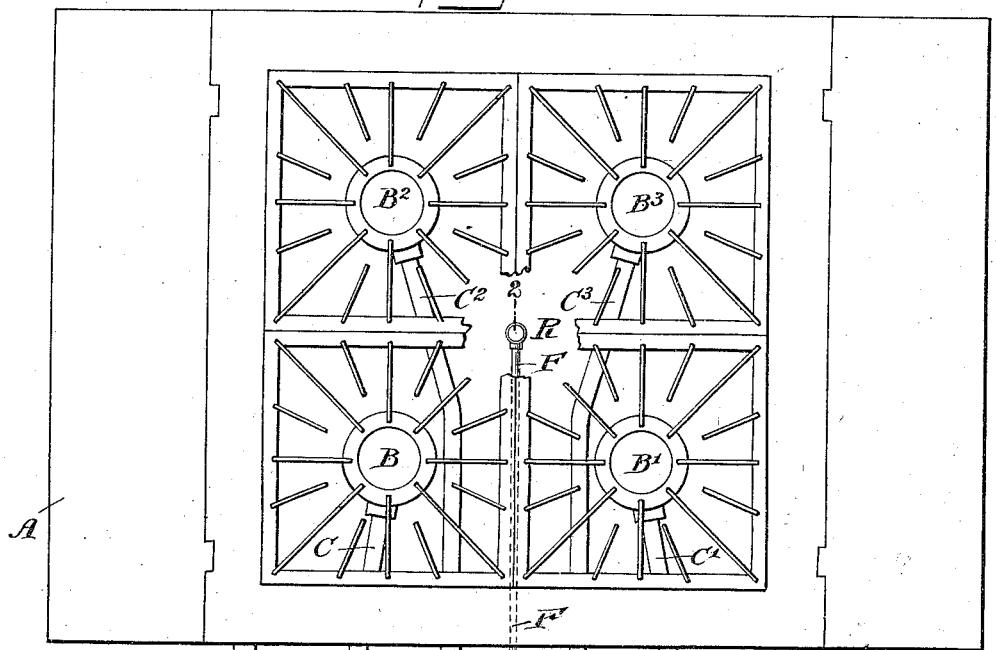
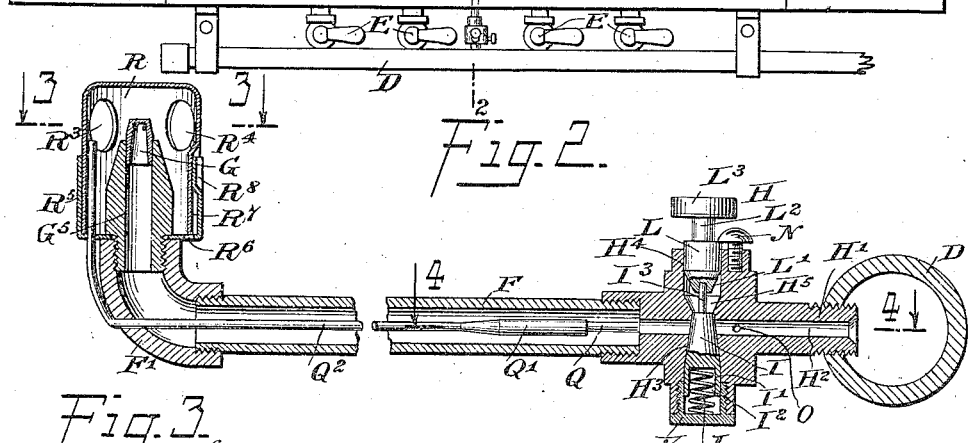
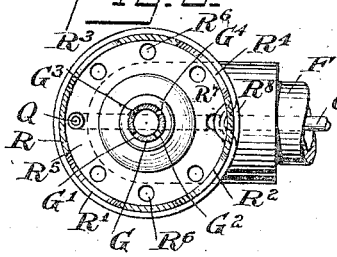
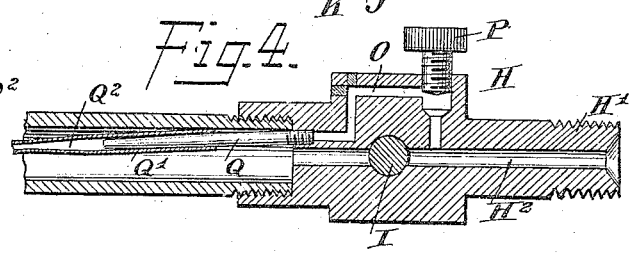
WITNESSES
George L. Blume.
INVENTOR
Eugene S. Allen
BY
ATTORNEYS

UNITED STATES PATENT OFFICE.

EUGENE S. ALLEN, OF NEW YORK, N. Y.

LIGHTING DEVICE FOR GAS-BURNERS.

1,124,383.

Specification of Letters Patent.

Patented Jan. 12, 1915.

Application filed April 30, 1914. Serial No. 835,565.

*To all whom it may concern:*

Be it known that I, EUGENE S. ALLEN, a citizen of the United States, and a resident of the city of New York, borough of Manhattan, in the county and State of New York, have invented a new and Improved Lighting Device for Gas-Burners, of which the following is a full, clear, and exact description.

The object of the invention is to provide a new and improved lighting device for gas rings or gas burners, preferably such as are used in gas ranges, and arranged to permit of simultaneously lighting all the gas rings or burners within the range.

The invention consists of novel features and parts and combinations of the same as will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the lighting device as applied to a gas range, part of which is shown broken out; Fig. 2 is an enlarged sectional elevation of the lighting device on the line 2—2 of Fig. 1; Fig. 3 is a sectional plan view of the same on the line 3—3 of Fig. 2; and Fig. 4 is a sectional plan view of the same on the line 4—4 of Fig. 2.

The gas range A to which the lighting device is shown applied is provided with the usual gas rings or burners B, B', B² and B³, supplied with gas by branch pipes C, C', C² and C³ connected with the gas supply pipe D usually located on the front of the range. Each of the branch pipes C, C', C² and C³ is provided with a valve E for controlling the flow of the gas to the corresponding gas ring or burner B, B', B² or B³.

A pipe F extends transversely between the burners B and B', that is, underneath the grid of the gas range A, as plainly indicated in Fig. 1, and the pipe F supports at its inner end a multiple burner G and is connected at its outer end with a valve H having its casing H' attached to the gas supply pipe D so that gas can pass from the supply pipe D by way of the valve H and the pipe F to a multiple burner G arranged approximately equal distances from the centers of the gas rings B, B', B² and B³. The multiple burner G is provided with individual burner openings G', G², G³ and G⁴ ranging in the direction of the gas rings B, B', B² and B³ so that when the multiple burner G is lighted, as hereinafter more fully explained, then the flames from the said burner openings G', G², G³ and G⁴ extend to the gas rings B, B', B² and B³ whereby the gas issuing from the said burners is ignited whenever the corresponding valves E are opened.

The valve H is provided with a longitudinally extending bore H² intersected at right angles by a conical valve seat H³ on which is seated a conical valve plug I provided on its base with a cylindrical extension I' having a recess I² in the under side, into which extends the upper end of a coil spring J seated on a cap K screwing in the bottom of the valve casing H'. The spring J normally returns the valve plug I to its seat H³ thus disconnecting the multiple burner G from the supply pipe D. The upper end of the valve plug I is provided with a pin I³ engaging a recess in the lower conical end L' of the cylindrical body of an actuating valve L mounted to slide in a bearing H⁴ arranged in the valve casing H'. The valve L is provided with a shank L² carrying a fingerpiece L³ adapted to be engaged by a finger of the operator to permit the latter to press the valve L downward so that the valve plug I is moved in a like direction whereby the valve plug I opens the bore H² to allow the gas to flow from the supply pipe D through the bore H² and pipe F to the multiple burner G. When the pressure on the fingerpiece L³ is released the valve L and the valve plug I return to their normal positions by the action of the spring J. The conical end L' of the valve L is adapted to be seated on a conical seat H⁵ formed on the lower end of the bearing H so as to close the bearing when opening the valve plug I to prevent leakage of gas by way of the said bearing H⁴. The upward movement of the valve L is limited by a set screw N screwing in the valve casing H', as plainly indicated in Fig. 2.

By reference to Fig. 2, it will be noticed that the small ends of the valve seats H³ and H⁵ are connected with each other, and when the valve L is pressed downward until the conical end L' is seated on its seat H⁵ then the valve plug I is moved into open position, but its opening movement is limited as the conical end L' cannot move farther down than its valve seat H⁵ and hence the spring J is not liable to be broken.

In order to ignite the gas issuing through the multiple burner G use is made of a constantly burning pilot light and for this purpose the following arrangement is made. A by-pass O leads from the bore H² at the point between the valve plug I and the supply pipe D, and the amount of gas passing through this by-pass O is controlled by a set screw P (see Fig. 4). The terminal of the by-pass O connects with a short pipe Q attached to the valve casing H', and the said short pipe Q extends into the enlarged end Q' of a pipe Q² which extends through the pipe F and its elbow F' to then bend upwardly to finally terminate in close proximity to the multiple burner G. It will be noticed that by the arrangement described gas will at all times pass by way of the supply pipe D, the bore H², by-pass O, pipes Q and Q' to the terminal of the pipe Q² at which the gas is burned, to ignite the gas issuing from the multiple burner G whenever the valve plug I is opened as previously explained.

The multiple burner G and the terminal of the pipe Q² are inclosed within a hood or deflector R provided in its side wall with openings R', R², R³ and R⁴ in register with the burner openings G', G², G³ and G⁴, as plainly indicated in Fig. 3. The hood or deflector R is removably seated in a cup-shaped base R⁵ attached to the upper end of the tube F' by the body G⁵ of the multiple burner G, which body screws into the upper end of the elbow F'. The bottom of the base R⁵ is provided with a number of openings R⁶ to permit air to pass into the hood R and to the multiple burner G. The hood or deflector R is provided in its side with a depression R⁷ fitting onto an inwardly extending struck-up lug R⁸ formed on the side of the base R⁵ so as to hold the hood R from turning and to hold the openings R', R², R³ and R⁴ in register with the burner openings G', G², G³ and G⁴.

Normally the pilot light in the hood R is burning while the valve plug I is in closed position, and when it is desired to light the gas rings or burners B, B', B² and B³ then the operator opens the valve E and presses the fingerpiece L³ of the valve L downward with a view to move the valve plug I into open position. Gas now flows from the supply pipe D to the multiple burner G, as previously explained, and the gas issuing through the burner openings G', G², G³ and G⁴ is ignited by the pilot light and the flames are directed to the gas rings B, B', B² and B³ to ignite the gas issuing therefrom. Thus by the arrangement described the gas rings can be readily ignited whenever their corresponding valves are opened by the use of auxiliary gas flames directed onto the gas rings by the multiple burner G so that the user of the gas range is not liable to burn the hand as when lighting the gas rings in the ordinary manner, avoiding the dangerous use of matches and waste of gas.

Having thus described my invention, I claim as new and desire to secure by Letters Patent:

1. A lighting device for a gas range provided with a controlling valve comprising a casing having a longitudinally extending bore and having a conical valve seat intersecting the said bore, the casing having a second conical valve seat in axial alinement with the said intersecting conical valve seat, a spring-pressed conical valve plug adapted to be seated on the said intersecting conical valve seat, and an actuating valve controlling the said valve plug and adapted to be seated on the said second valve seat at the time the valve plug is moved into open position by the said valve.

2. A lighting device for a gas range provided with a controlling valve, comprising a casing having a longitudinally extending bore and having a conical valve seat intersecting the said bore, the casing having a second conical valve seat in axial alinement with the said intersecting conical valve seat, a conical valve plug adapted to be seated on the said intersecting valve seat, a spring pressing the said valve plug and holding it normally to its seat, and a valve slidable in the said casing and having a conical end engaging the said valve plug, the said conical end being adapted to be seated on the said second valve seat and being normally held off its seat by the said valve plug, the said valve having a fingerpiece under the control of the operator.

3. A lighting device for a gas range provided with a burner pipe, a manually controlled inlet valve on one end of the said pipe and connected with a source of gas supply, a burner at the other end of the said burner pipe, a hood inclosing the said burner and provided at the sides with openings, and a cup-shaped base held on the burner end of the said pipe and in which the said hood is removably seated.

4. A lighting device for a gas range provided with a burner pipe, a manually-controlled inlet valve on one end of the said pipe and connected with a source of gas supply, a burner at the other end of the said burner pipe, a hood inclosing the said burner and provided at the sides with openings, and a cup-shaped base held on the burner end of the said pipe and in which the said hood is removably seated, the said base being provided at its bottom with air inlet openings.

5. A lighting device for a gas range provided with a burner pipe, a manually controlled inlet valve on one end of the said pipe and connected with a source of gas supply, a burner at the other end of the said burner pipe, a hood inclosing the said burner and provided at the sides with openings, and a cup-shaped base held on the burner end of the said pipe and in which the said hood is removably seated, the said hood being provided in its side with a depression and the said base being provided with an inwardly extending struck up lug engaged by the said depression.

In testimony whereof I have signed my name to this specification in the presence of two subscribing witnesses.

EUGENE S. ALLEN.

Witnesses:
P. CARMER,
CHAS. E. STEVENS.